United States Patent [19]

Szèchènyi

[11] Patent Number: 4,598,413
[45] Date of Patent: Jul. 1, 1986

[54] CIRCUIT ARRANGEMENT FOR FRAME AND PHASE SYNCHRONIZATION OF A LOCAL SAMPLING CLOCK

[75] Inventor: Kalman Szèchènyi, Spiegelberg, Fed. Rep. of Germany

[73] Assignee: International Standard Electric Corporation, New York, N.Y.

[21] Appl. No.: 649,866

[22] Filed: Sep. 12, 1984

[30] Foreign Application Priority Data

Sep. 17, 1983 [DE] Fed. Rep. of Germany ....... 3333714

[51] Int. Cl.$^4$ .............................................. H04L 7/08
[52] U.S. Cl. .................................. 375/116; 370/105; 375/119
[58] Field of Search ................ 375/114, 116, 96, 119; 370/100, 105, 106; 371/42

[56] References Cited

U.S. PATENT DOCUMENTS

| | | | |
|---|---|---|---|
| 3,144,515 | 8/1964 | Kaneko | 370/100 |
| 3,251,034 | 5/1966 | Goode et al. | 375/114 |
| 3,575,554 | 4/1971 | Schmidt | 375/116 |
| 3,641,274 | 2/1972 | Sasaki et al. | 375/114 |
| 3,735,045 | 5/1973 | Clark | 370/105 |
| 3,770,897 | 11/1973 | Haussman et al. | 370/105 |
| 3,798,378 | 3/1974 | Epstein | 370/105 |
| 4,112,498 | 9/1978 | Reiner et al. | 370/100 |
| 4,203,002 | 5/1980 | Nossen | 375/116 |

OTHER PUBLICATIONS

Digital Synchronizer—R. J. Galpin, IBM Technical Disclosure Bulletin, vol. 15, No. 1, Jun. 1972, pp. 81–82.

Primary Examiner—Marc E. Bookbinder
Attorney, Agent, or Firm—John T. O'Halloran; Robert P. Seitter

[57] ABSTRACT

With such a circuit arrangement, the sampling clock is synchronized to the frame position and the phase of the characters of a received character stream containing a "unique word" at regular intervals. In a digital correlator (1), a crosscorrelation function is generated from a unique word stored therein and from the received, sampled character stream, and a frame detection circuit (2) derives a frame clock (RT1) from those maxima of the crosscorrelation function recurring at intervals of one frame period. To achieve synchronization at any polarity of the received character stream (i.e., even if the tip and ring wires of the subscriber line are interchanged), a second frame detection circuit (3) derives a second frame clock (RT2) from those minima of the crosscorrelation function recurring at intervals of one frame period. A clock selection circuit (8) determines which of the two frame clocks is received within a limited time interval. From this frame clock, control information for representing the phase of the sampling clock (AT) is derived in a phase synchronization circuit (10).

10 Claims, 7 Drawing Figures

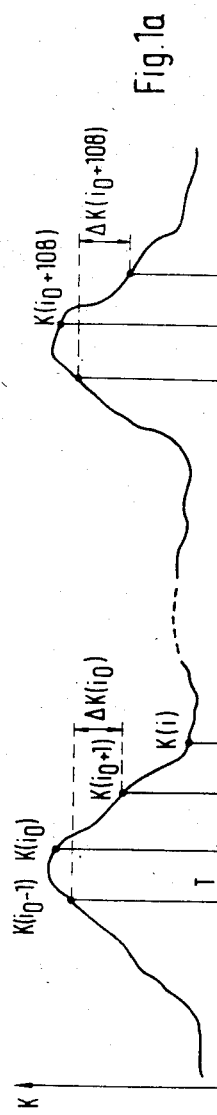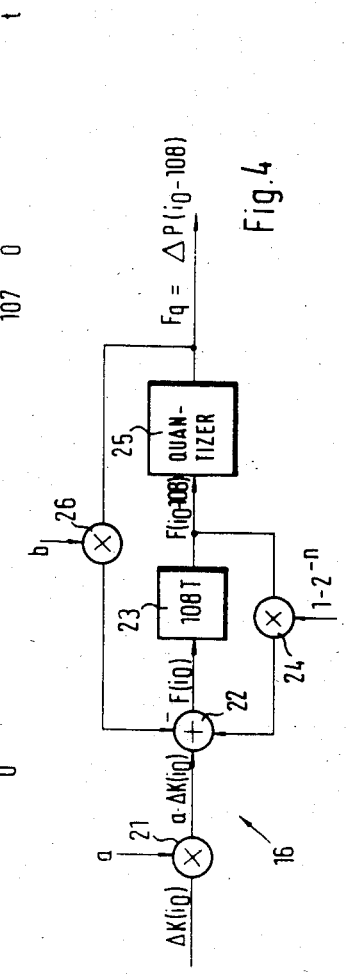

CIRCUIT ARRANGEMENT FOR FRAME AND PHASE SYNCHRONIZATION OF A LOCAL SAMPLING CLOCK

BACKGROUND OF THE INVENTION

The present invention relates to a circuit arrangement for synchronizing a local sampling clock to the frame position and the phase of the characters of a received character stream containing a unique word at regular time intervals, wherein a digital correlator generates a crosscorrelation function from the received character stream, sampled at the sampling clock rate, and a unique word stored at the receiving end, and wherein a frame detection circuit derives a first frame clock from those maxima of the crosscorrelation function recurring at intervals of one frame period.

In such a circuit arrangement, the frame clock is recovered from a "unique word" by using digital correlation techniques, whereas the bit clock is recovered, in a manner not described, from an additional bit pattern preceding the unique word (IEEE Transactions on Communication Technology, Vol. COM-16, No. 4, August 1968, pp. 597 to 605). This circuit arrangement is intended for time-division multiple-access satellite communication systems, but the problem that the frame clock and the phase of the sampling clock must be synchronized to the received digital characters also arises in TDM wire communication systems for, e.g., two-wire full-duplex transmission over telephone subscriber lines. This is particularly difficult if the received digital characters are heavily distorted and cannot be equalized until after determination of the appropriate phase of the sampling clock.

A prior patent application (P No. 32 27 151.4) published on Feb. 2, 1984 has for its object to provide a circuit arrangement of the above kind which is also suitable for a heavily distorted received character stream. This object is attained by providing a phase synchronization circuit which derives control information for adjusting the phase of the sampling clock from values of the crosscorrelation function in the vicinity of each detected recurrent maximum, and adjusts the phase of the sampling clock with this control information. Furthermore, a clock-signal-synchronizing circuit has been provided in which the deviation of a characteristic, periodically recurring parameter of the received signal is measured at two different instants, and from the two measured values, the respective average of an error signal is determined. With this error signal, the clock phase is adjusted until the error signal disappears. As the characteristic parameter, the envelope of the received signal is used, for example (DE-OS No. 27 29 312). This clock synchronization, however, is designed specifically for data communication systems using phase-shift keying and requires quite a large amount of circuitry.

The clock recovery described in the prior application requires that the polarity of the received signal be known. However, this is not always insured because it is possible, for example, that the tip wire and the ring wire of the subscriber line are interchanged.

SUMMARY OF THE INVENTION

The object of the invention is to derive the bit and frame clocks from a received character stream of arbitrary polarity. The invention is characterized in that a second frame detection circuit derives a second frame clock from those minima of the crosscorrelation function recurring at intervals of one frame period, that a clock selection circuit determines which of the two frame clocks is being received within a limited time interval, and that from this frame clock, control information for representing the phase of the sampling clock is derived in a phase synchronization circuit.

A principal advantage of the invention is that it improves the phase adjustment criterion.

BRIEF DESCRIPTION OF THE DRAWINGS

An embodiment of the invention will now be explained with reference to the accompanying drawings, in which:

FIGS. 1a and 1b illustrate the fundamental principle of the invention with the aid of a simplified sequence of values of the crosscorrelation function when the sampling clock is out of phase with the received character stream, and when the sampling clock is in phase with the received character stream;

FIG. 4 shows a smoothing accumulator as used in the circuit arrangement of FIG. 3;

DESCRIPTION OF THE PREFERRED EMBODIMENT

Figure 2:
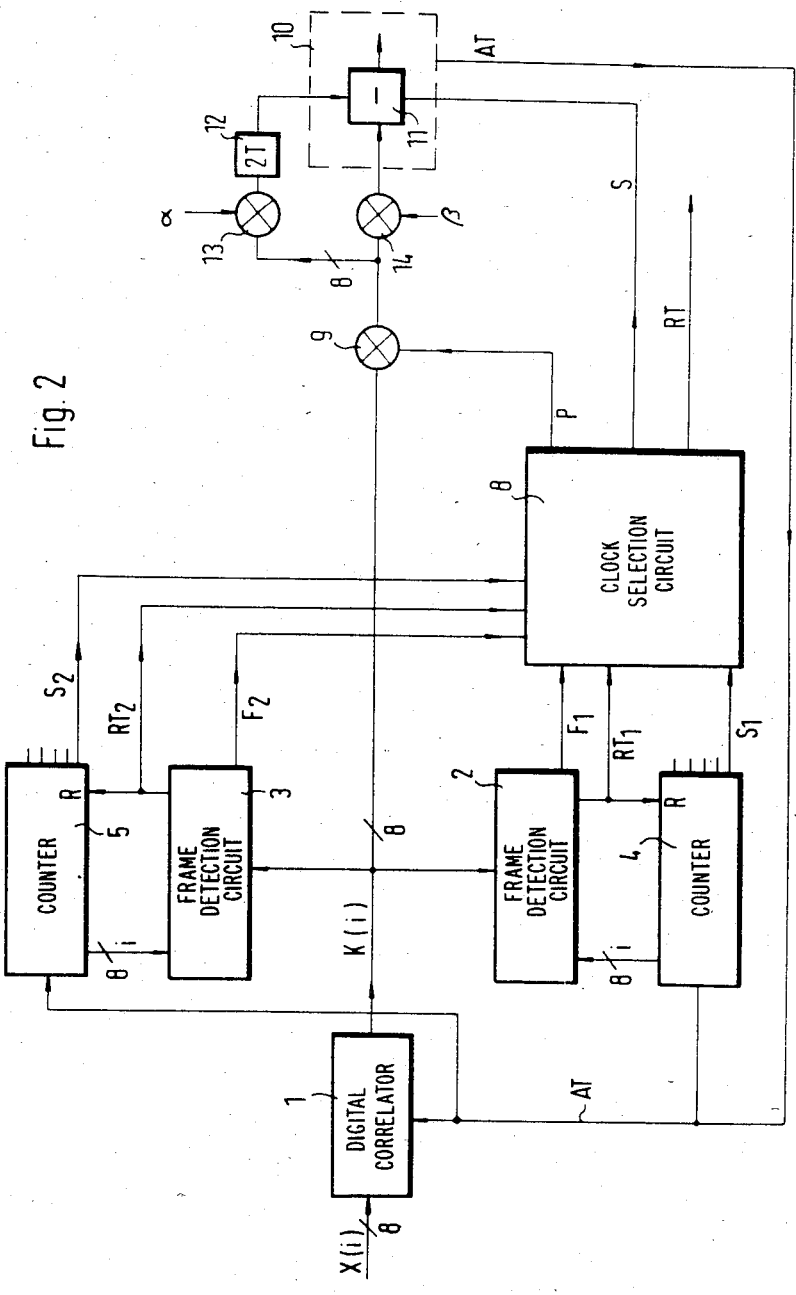
FIG. 2 is a block diagram of the circuit arrangement in accordance with the invention.

The input of the circuit arrangement in accordance with the invention is presented with the sample values of the received character stream, consisting of ternary characters, for example, each of which is sampled once. The sample values X(i), following each other at the repetition rate of the sampling clock, are correlated in a digital correlator with a unique word stored at the receiving end and consisting of, e.g., 12 binary characters to obtain values K(i) of the crosscorrelation function which follow each other at the sampling rate. Mathematically, these values can be expressed as $$K(i) = \sum_{v=0}^{11} X(i-v) \cdot W(12-v), \quad (1)$$

where $W(12-v)$ signifies a bit of the 12-bit unique word. Except in case of distortions, the crosscorrelation function $K(i)$ would have to assume a maximum value whenever the sample values $X(i-v)$, to be synchronized with the unique word, are the sample values of the unique word contained in the character stream at intervals of one frame period. A frame detection circuit then locates those relative maxima in the entire sequence $K(i)$ of the values of the crosscorrelation function which recur at intervals of one frame period. In the example of FIG. 1a, there are the values with the indices $i_0$ and $(i_0+108)$. These indices differ by 108 periods of the sampling clock because, in the example just described, a frame consists of 108 characters. However, a frame may also consist of 120 characters, for example. If the polarity of the received signal is known, the recurrent relative maxima thus inform the receiver of the frame clock of the received time-division-multiplex signal. If, during the sampling process, the sampling period were made to approach zero, the simplified shape of the correlation function drawn as a solid line in FIG. 1 would be obtained, which shows that the values K(i) obtained by sampling at intervals of one sampling period T depend on the phase of the sampling clock. In the case of the sampling clock phase shown in FIG. 1a, the maximum possible values of the crosscorrelation function cannot be determined in this manner. If, however, the phase of the local sampling clock is shifted to the position shown in FIG. 1b, the detected recurrent relative maxima $K(i_0)$ are actually the real maxima of the crosscorrelation function.

If the unique word is suitably chosen, the crosscorrelation function has the property of approximately reproducing the impulse response of the transmission path, with the extrema of the crosscorrelation function coinciding with the extrema of the impulse response. The clock phase, giving the extreme values of the crosscorrelation function, also gives the extreme values of the impulse response and, thus, represents the desired clock phase for sampling the received characters.

To adjust the phase of the sampling clock, the invention uses values of the correlation function which lie in the vicinity of the recurrent maximum $K(i_0)$. For example, use can be made of the value preceding the recurrent maximum value, i.e., the value $K(i_0-1)$, and the value following the recurrent maximum value, i.e., $K(i_0+1)$. As shown in FIG. 1a, the difference between these values, $\Delta K(i_0)$, is different from zero if the value $K(i_0)$ is not the actual maximum value. Therefore, this difference can be used as a controlled variable for adjusting the clock phase. As shown in FIG. 1b, the difference $\Delta K(i_0)$ disappears if $K(i_0)$ is the maximum possible value of the correlation function at the instantaneous sample value $X(i_0)$. FIG. 1b thus gives the phase of the sampling clock in the phase-locked condition.

To be able to achieve frame and phase synchronization at any polarity of the received character stream, both the maxima and the minima of the crosscorrelation function are evaluated in accordance with the invention, as mentioned above. This will be discussed later.

The shape of the correlation function shown in FIG. 1 has been greatly simplified in comparison with the actual shape. In reality, the recurrent relative extrema are much more difficult to detect because of the heavy distortions of the received character stream, and a random sequence is superimposed on the successively determined difference values $\Delta K$, so that the differences can be used as reliable controlled variables only after a smoothing process.

The circuit arrangement according to the invention contains a digital correlator 1 (FIG. 2) to whose input the sample values X(i) of the received characters are applied as 8-bit words, which are continuously correlated at the character sampling rate AT with the unique word stored in the correlator to form the values K(i) of the crosscorrelation function. These values K(i), which are 8-bit words like the input words, are fed to a first frame detection circuit 2 and a second frame detection circuit 3 which determine, by means of simple logic gates, the locations of the recurrent relative maxima and minima, respectively, of the crosscorrelation function and, thus, a first frame clock RT1 and a second frame clock RT2, respectively, for the received TDM signal. Each of the frame detection circuits 2, 3 is connected to a modulo-108 counter 4, 5, whose count input is presented with the sampling clock AT and whose count i serves to determine the frame clock. The index i is counted modulo 108 because, in the embodiment being described, the unique word recurs after every 108 characters. Each output pulse of the frame detection circuit 2, signifying a detected recurrent maximum of the crosscorrelation function, and each output pulse of the frame detection circuit 3, signifying a detected recurrent minimum of this function, reset the counters 4 and 5, respectively, to a predetermined count $i_0$, e.g., zero, via reset inputs R.

The output signals of the first frame detection circuit 2 and the second frame detection circuit 3 represent a first frame clock RT1 and a second frame clock RT2, respectively, which are applied to a clock selection circuit 8.

When the first frame detection circuit 2 detects a periodically recurring maximum of the crosscorrelation function, it indicates this to the clock selection circuit 8 by a signal F1=1. In the absence of a periodically recurring maximum, F1=0. Analogously, the second frame detection circuit 3 provides a signal F2=1 when it detects a periodically recurring minimum of the crosscorrelation function.

If two frame clocks RT1 and RT2 are generated in this manner, because the crosscorrelation function has both periodically recurring maxima and periodically recurring minima, only one of them can be the correct frame clock. The latter is determined by the relationship between the waveforms of the two clocks. The clocks can be shifted with respect to each other by a limited time interval in accordance with the actual impulse response of the transmission path, this interval having to be shorter than half a frame period. In the case of a frame consisting of 108 digital characters, the limited time interval thus can theoretically comprise a maximum of about 50 character clock periods. In practice—and also in the present embodiment—it turned out, however, that the limited time interval equals 8 clock periods at the most. The clocks can be shifted in time with respect to each other by 2 to 8 periods. The first clock that occurs within those two to eight periods is the correct frame clock. The phase relationships are apparent from FIG. 6, which will be explained later. Details of the clock selection circuit 8 will be explained with the aid of FIGS. 4, 5, and 6.

According to the selection made, the correct frame clock RT is transferred to one output of the clock selection circuit 8. A second output of the clock selection circuit 8 provides a polarity signal P which can assume the value +1 or −1, assigned to it depending on the clock selection. In a multiplier 9, the polarity signal P is combined with the values K(i) of the crosscorrelation function, so that the correct polarity of the difference $\Delta K$ is ensured.

The frame clock RT now determines which values of the crosscorrelation function are selected from the set of of values K(i) and used to form the controlled variable. As explained with the aid of FIG. 1, these are the values $K(i_0+1)$ and $K(i_0-1)$, which lie in the vicinity of the value $K(i_0)$ found to be the recurrent maximum. Since the counters 4, 5 are reset to zero at the instant $i_0$, the value $K(i_0+1)$ is available when the counters 4, 5 have the count 1. All values K(i) are applied successively from the output of the digital correlator via the multiplier 9 to a phase synchronization circuit 10 containing a subtracter 11 at its input end. This subtracter 11 is started by applying a control signal S to its control input only when either the counter 4 or the counter 5 reaches the count 1. This count is indicated in the clock selection circuit by a signal S1 or S2, respectively, and converted there into the control signal S after suitable selection.

At the second signal input of the subtracter 11, output values K(i) from the digital correlator 1 appear with a delay of two sampling periods T which is generated in a delay element 12. The functions of two multipliers 13 and 14 ahead of the two signal inputs of the subtracter 11 will be explained later.

While the positive control signal S is applied to its control input, the subtracter 11 forms the difference $\Delta K(i_0)$ between the values $K(i_0+1)$ and $K(i_0-1)$ of the crosscorrelation function. The other parts of the phase synchronization circuit 10 and the further processing of the difference values will be explained with the aid of FIG. 3. It should be noted at this point, however, that the phase synchronization circuit 10 delivers a character sampling clock AT which is phase-locked to the received character stream and is applied to the digital correlator 1 and the counters 4 and 5.

Investigations have shown that, if the signals transmitted over subscriber lines are heavily distorted, e.g., in the case of long subscriber lines or in the presence of "bridged taps", the function used to set the sampling instant, $$\Delta K = K(i_0=1) - K(i_0+1),$$

can still be optimized, for the signals are sampled after the correlation maximum and, hence, after the maximum of the impulse response. This gives relatively large preshoots which are difficult to equalize. The equalizer coefficients become greater than 1, so that stability problems are created. In addition, the noise amplification of the necessary preequalizer may become unacceptable. These difficulties can be avoided in a very advantageous manner if the phase is adjusted in accordance with the following criterion. An $\alpha$ times greater weight is assigned to the value $K(i_0-1)$. This gives the following compensation function:

$$\Delta K' = \alpha K(i_0-1) - K(i_0+1).$$

The factor $\alpha$ preferably has the value 2, 4 or 8. In the case of subscriber lines, $\alpha = 4$ proved very advantageous.

The values $K(i_0-1)$ of the crosscorrelation function are multiplied by the factor $\alpha$ in a multiplier 13.

There are cases where it is more favorable to transform the foregoing function by dividing it by $\alpha$:

$$\Delta K'' = \alpha \cdot K(i_0-1) - \beta K(i_0+1),$$

where $\beta = 1/\alpha$. The values $K(i_0+1)$ are multiplied by the value $\beta$ in a multiplier 14.

In both cases, the changed weight of the values of the correlation function results in the signals being sampled before the correlation maximum. As a result, the preshoots decrease. A slight loss in the sampled intensity of the signal maximum is more than offset by a signal-to-noise improvement.

Of the two multipliers 13 and 14, only one is present; it is subjected to a factor different from 1.

As mentioned, the difference values $\Delta K(i_0)$, formed successively in the subtracter 11, need to be smoothed, which is done in a smoothing accumulator 16 (FIG. 3) following the subtracter.

Figure 3:
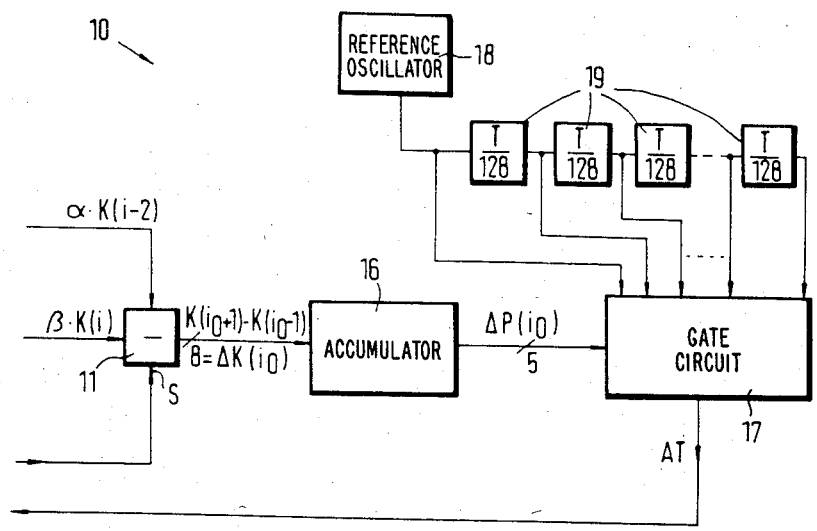
FIG. 3 shows a phase synchronization circuit as used in the circuit arrangement of FIG. 2.

This smoothing accumulator 16, which will be explained below with the aid of FIG. 4, thus receives one input value $\Delta K(i_0)$ per frame period and provides at its output, at intervals equal to one frame period, control information $\Delta P$ which can be used directly to adjust the phase of the character sampling clock by a corresponding number of increments. The control information $\Delta P$ is preferably an integer, which may also be zero. For this control information $\Delta P$, including its sign, 5 bits are sufficient, and it is capable of controlling a gate circuit 17 to select the appropriate clock phase (FIG. 3).

At a number of parallel inputs, the gate circuit 17 receives the clock from a reference-frequency oscillator 18 with the clock period T and different clock phases. The clock phases at the individual inputs of the gate circuit differ from each other by the same increment. If, for example, the phase of the sampling clock is to be made adjustable in 128 increments, the reference clock from the output of the reference-frequency oscillator 18 will be applied to a chain of 128 delay elements 19, each of which delays the phase of the clock by $T/128$ with respect to the clock phase provided by the preceding delay element in the chain. The clocks available in front of and behind the delay elements 19 now form the parallel input clocks for the gate circuit 17, from which only one is selected as the phase-adjusted character sampling clock AT under control of the control information $\Delta P$.

The phase adjustment in the gate circuit 17 is performed by advancing or delaying the phase by as many increments as is specified by the control information $\Delta P$, including its sign. If $\Delta P$ is equal to $+3$, for example, the clock passing through the gate circuit 17 will be blocked, and instead, the clock delayed by three phase increments more will be allowed to pass through. If, on the other hand, the control information $\Delta P = -2$, changeover will be effected in the gate circuit 17 such that the latter passes the clock delayed by two phase increments less, which is then used as the adjusted character sampling clock AT in the entire circuit arrangement. This character sampling clock is applied from the gate circuit 17 to the digital correlator 1, the counters 4, 5 and to other receiving devices to be operated at the repetition rate of the received characters, e.g., the sample-and-hold circuit (not shown). The circuit arrangement in accordance with the invention thus represents a digital phase-locked loop which differs from all conventional digital phase-locked loops in that it establishes both frame and character synchronization.

The difference values appearing at the input of the smoothing accumulator 16 (see FIG. 4), $\Delta K(i_0)$, are multiplied in a multiplier 21 by a factor a which is smaller than 1. The multiplied values, $a \cdot \Delta K(i_0)$, are fed to an adder 12 whose output values F(i) are delayed in a delay element 23 by 108 periods T of the sampling clock, i.e., by one frame period. From the output of the delay element 23, the function values F are fed back to another input of the adder 22, where they are added, like in a normal accumulator, to the input values $a \cdot \Delta K(i_0)$ to obtain the new value F. The accumulator slightly differs from a conventional accumulator in that the values fed back, F, are multiplied by a factor of $1-2^{-n}$ (n=integer) in a multiplier 24, the value n being chosen so that this factor is close to 1. The values F are applied at intervals of one frame period from the output of the delay element 23 to a quantizer 25, which converts them into integers $F_q$ by rounding them off. (Input values F smaller than 1 are rounded off to zero).

The output of the quantizer 25 thus provides, at intervals of one frame period, integers $F_q$ which may be positive, negative, and zero. These output values $F_q$ are finally used as the above-explained control information $\Delta P$. In addition, they are fed back to a further input of the adder 22 via a multiplier 26 in which they are multiplied by a factor b smaller than 1. The adder input is an inverting input, so that the value fed back, $b \cdot \Delta P$, will be subtracted from the input value $a \cdot \Delta K(i_0)$ after each phase adjustment. (At $\Delta P = 0$, no phase adjustment takes place). Thus, a phase adjustment is taken into account in determining the subsequent control information $\Delta P$.

The accumulation described, together with the quantization, causes the differences $\Delta K$ to be smoothed as desired, and derives a reliable controlled variable $\Delta P$ from a sequence of values $\Delta K$ superimposed on a random sequence. Since the phase adjustments are made only during the period of the unique word, as described above, the unwanted phase noise associated with the phase adjustment is limited to the intervals of the unique word and, thus, cannot cause any transmission errors.

Figure 5:
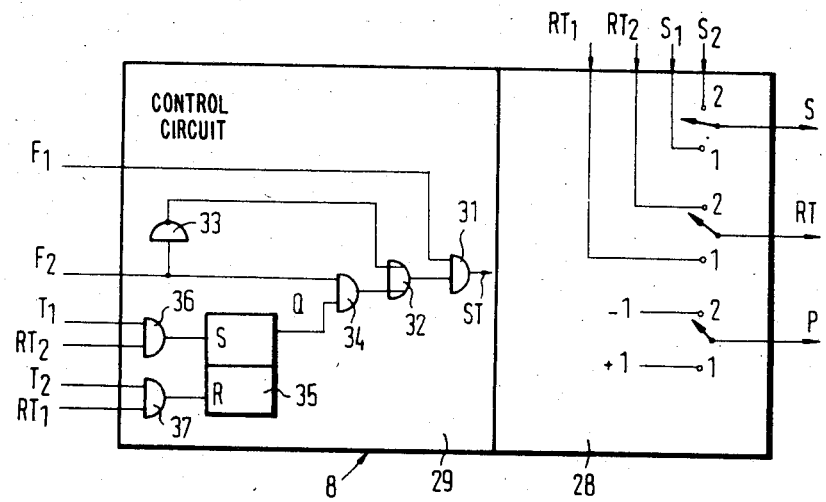
FIG. 5 shows a clock-selection and polarity-control circuit as used in the circuit arrangement of FIG. 2.

The clock-selection and polarity-control circuit 8 consists of a group of switches 28 and a control circuit 29 (FIG. 5). The group of switches 28 contains a first switch whose two inputs are presented, respectively, with the control signals S1 and S2 provided by the counter 4 and 5, a second switch whose two inputs are presented, respectively, with the frame clocks RT1 and RT2 provided by the frame detection circuit 2 and 3, and a third switch to whose two inputs the voltages "−1" and "+1" are applied. The positions of these three switches are determined by a switch control signal ST which is produced in the control circuit 29. When this signal ST is in the "H" state, the three switches are in the positions shown in the drawing; when the signal is in the "L" state, the switches are in the other positions.

The control circuit 29 contains an AND gate 31 whose two inputs are presented with the signal F1 from the frame detection circuit 2 and the signal from an OR gate 32, respectively. The output of the AND gate 31 provides the switch control signal ST. The two inputs of the OR gate 32 are presented, respectively, with the signal $\overline{F2}$ from the frame detection circuit 3, which was inverted in an inverter 33, and the output signal of an AND gate 34. One input of the latter is presented with the signal F2, and the other with the output signal Q of a flip-flop 35. The S input of the flip-flop 35 is presented with the output signal of an AND gate 36, which combines a first auxiliary clock T1 (cf. FIG. 6) with the frame clock signal RT2. The R input of the flip-flop 35 is presented with the output signal of a further AND gate 37, which combines a second auxiliary clock T2 with the frame clock signal RT1 provided by the frame detection circuit 2.

Figure 6:
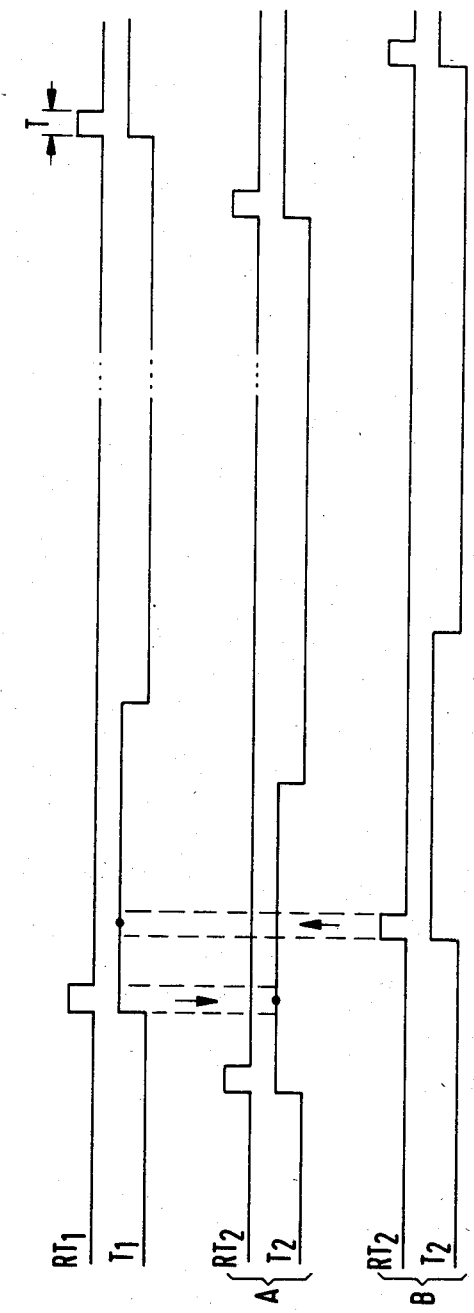
FIG. 6 shows the waveforms of the various clock signals in the circuit arrangement in accordance with the invention.

The input signals, T1, T2, RT1, and RT2, which will be explained below with the aid of FIG. 6, are combined in the control circuit 29 to form a switch control signal ST. When the latter is in the H state (logic 1), the output signals of the group of switches and, thus, of the clock selection circuit 8 are:

$S = S1$, $RT = RT1$, and $P = +1$.

When the switch control signal ST is in the L state (logic 0), the output signals are:

$S = S2$, $RT = RT2$, and $P = -1$.

The signals T1 and T2, illustrated in FIG. 6 in the second, fourth, and sixth lines from the top, are auxiliary clocks which are generated by the frame clock signals RT1 and RT2, respectively, and define the limited time interval within which the clock selection circuit 8 makes its decision. Their pulse lengths depend on the application, as mentioned above; in the present case, it is equal to eight clock pulse periods, i.e., $8 \times T$, while one frame period is equal to 108 clock pulse periods and has a duration of 1 ms.

In the case A, illustrated in lines 3 and 4, the first frame clock pulse to occur within the time interval defined by the auxiliary clock T2 is a pulse of the frame clock RT2, so this is the frame clock recognized as correct in the clock selection circuit 8.

In the case B, illustrated in lines 5 and 6, the first frame clock pulse to occur within the time interval defined by the auxiliary clock T1 is a pulse of the frame clock RT1, which is thus recognized as the correct frame clock and passed on by the clock selection circuit 8.

I claim:

1. An arrangement for synchronizing a local sampling clock to frame position and phase of the characters of a received character stream containing a unique word at regular time intervals, said arrangement including a digital correlator which generates a crosscorrelation function from the received character stream, sampled at a sampling clock rate, and a unique word stored in said correlator and comprising a first frame detection circuit which derives a first frame clock from those maxima of the crosscorrelation function recurring at intervals of one frame period, and a second frame detection circuit (3) which derives a second frame clock from those minima of the crosscorrelation function recurring at intervals of one frame period, the time of a first occurrence of a maximum or a minimum having a time index $i_0$, and further comprising a clock selection circuit (8) connected to said frame detection circuits which determines which of the two frame clocks is being received within a limited time interval, and comprising also a phase synchronization circuit (10) connected to said clock selection circuit, said phase synchronization circuit receiving control information related to the selected frame clock for providing phase information ($\Delta P$) for control of the sampling clock (AT), said phase synchronization circuit also being coupled to said digital correlator whereby values of said crosscorrelation function are fed thereto and wherein the phase information ($\Delta P$) is provided as a function of values $K(i_0 + 1)$, $K(i_0 - 1)$ which the crosscorrelation function has in the vicinity of the maximum or minimum.

2. A circuit arrangement as claimed in claim 1, characterized in that the clock selection circuit (8) produces a polarity signal (P) which determines the polarity of the values $\{K(i)\}$ of the crosscorrelation function fed to the phase synchronization circuit (10).

3. A circuit arrangement as claimed in claim 2, characterized in that the clock selection circuit (8) consists of:

(1) a group of switches (28) by which the frame-clock signal (RT1, RT2), said signal (P) determining the polarity of the values of the crosscorrelation function $\{K(i)\}$, and a control signal (S) for forming the difference between these values are switched through, and (2) a control circuit (29) which produces a switch control signal (ST) determining the position of the group of switches (28).

4. A circuit arrangement as claimed in claim 3, characterized in that the phase synchronization circuit (10) is preceded by an adjusting device (13, 14) which shifts the sampling instants ahead of the instants at which the maxima of the crosscorrelation function {K($i_0$)} occur.

5. A circuit arrangement as claimed in claim 1 characterized in that the clock selection circuit (8) produces a polarity signal (P) which determines the polarity of the values [K(i)] of the crosscorrelation function fed to the phase synchronization circuit (10).

6. A circuit arrangement as claimed in claim 5, characterized in that the clock selection circuit (8) consists of:

(1) a group of switches (28) by which the frame-clock signal (RT1, RT2), a signal (P) determining the polarity of the values of the crosscorrelation function [K(i)], and a control signal (S) for forming the differences between these values are switched through, and (2) a control circuit (29) which produces a switch control signal (ST) determining the position of the group of switches (28).

7. A circuit arrangement as claimed in claim 6, characterized in that the phase synchronization circuit (10) is preceded by an adjusting device (13, 14) which shifts the sampling instants ahead of the instants at which the maxima of the crosscorrelation function [K($i_0$)] occurs.

8. A circuit arrangement as claimed in claim 1, characterized in that the clock selection circuit (8) consists of:

(1) a group of switches (28) by which the frame-clock signal (RT1, RT2), a signal (P) determining the polarity of the values of the crosscorrelation function [K(i)], and a control signal (S) for forming the differences between these values are switched through, and (2) a control circuit (29) which produces a switch control signal (ST) determining the position of the group of switches (28).

9. A circuit arrangement as claimed in claim 8, characterized in that the phase synchronization circuit (10) is preceded by an adjusting device (13, 14) which shifts the sampling instants ahead of the instants at which the maxima of the crosscorrelation function [K($i_0$)] occurs.

10. A circuit arrangement as claimed in claim 1, characterized in that the phase synchronization circuit (10) is preceded by an adjusting device (13, 14) which shifts the sampling instants ahead of the instants at which the maxima of the crosscorrelation function [K($i_0$)] occurs.

* * * * *